United States Patent [19]
Buckley et al.

[11] Patent Number: 4,519,674
[45] Date of Patent: May 28, 1985

[54] RETRO-REFLECTIVE PRISM ASSEMBLY

[76] Inventors: Galen L. Buckley, 40 Ashwood, Irvine, Calif. 92715; Kenneth Panique, 19371 Lemon Hill Dr., Santa Ana, Calif. 92705

[21] Appl. No.: 481,920

[22] Filed: Apr. 4, 1983

Related U.S. Application Data

[63] Continuation-in-part of Ser. No. 473,782, Mar. 10, 1983, abandoned.

[51] Int. Cl.³ .......................... G01C 15/06; G02B 7/18
[52] U.S. Cl. ....................................... 350/102; 33/293; 350/287; 350/590; 356/247
[58] Field of Search ................ 350/102, 107, 286–288, 350/299, 590; 33/277 F, 280, 293; 356/247; D10/61, 66

[56] References Cited

U.S. PATENT DOCUMENTS 4,311,382  1/1982  Buckley et al. ..................... 350/102
4,470,664  9/1984  Shirasawa ........................... 350/287

FOREIGN PATENT DOCUMENTS 2354935  5/1975  Fed. Rep. of Germany ...... 350/102

OTHER PUBLICATIONS

*AGA Reflector System,* AGA Corporation, Geodimeter Division, (date unknown).
*Topcon Reflector System,* Topcon Instrument Corporation of America, (date unknown).

*Primary Examiner*—John K. Corbin
*Assistant Examiner*—William Propp
*Attorney, Agent, or Firm*—Leonard Tachner

[57] ABSTRACT

A retro-reflective prism assembly for use with electronic distance measuring instruments in surveying and other civil engineering applications. The unique structure permits tilting and plunging the assembly without requiring a separate tiltable bracket. A novel housing and sealing arrangement positions and seals the prism for limiting shock and preventing water leakage while obviating any need for coating the rear surfaces of the prism. An eccentric tilting knob simplifies angular tilt setting while a convenient transit knob simplifies azimuth adjustment. Vertical sighting holes in the yoke of the assembly provide for convenient plumbing of the assembly. A uniquely configured dust cover is designed for convenient storage on the back of the prism housing during use of the assembly. Target indicia are applied to both the front and back surfaces of the dust cover to provide a novel target device which may be secured to the face of the prism and to the back of the prism for range targeting with an offset and without an offset, respectively.

9 Claims, 14 Drawing Figures

RETRO-REFLECTIVE PRISM ASSEMBLY

This application is a continuation-in-part of application Ser. No. 473,782, filed Mar. 10, 1983, abandoned.

BACKGROUND OF THE INVENTION

1. Field of the Invention

This invention relates generally to distance measuring apparatus and more specifically, to an improved retroreflective prism assembly for use in conjunction with distance measuring instruments that employ infrared or laser ranging systems.

2. Prior Art

The last decade or so has seen the rapid development of microprocessors and infrared and laser optical systems with the resulting development of various electronics distance measuring systems for use in civil engineering applications including surveying. Usually such electronic distance measuring instruments consist of two main components, namely, the electronic ranging system that utilizes a transmmitter/receiver of either infrared or laser energy that is transmitted to a remotely and previously placed reflector assembly, and a sighting telescope that is used to accurately point the ranging system transmitter at the distantly located reflector. Consequently, the remotely located reflectors utilize retroreflector devices such as prisms or other such reflecting optics that reflect incident energy on a path that colinear with that instant energy. Even though retroreflector devices or prisms are designed to return incident infrared or laser energy over a broad range of incoming angles with respect to the face of the reflector, the sensitivity of the receiver portion of the electronic distance measuring instruments usually requires that the reflector be adjusted to be substantially normal to the incoming energy. Consequently, it is desirable to have a retro-reflector device that is adjustable both in elevation and azimuth with respect to the tripod upon which the device is mounted. Unfortunately, prior art retro-reflective prism assemblies do not provide for tilting capability for electrical adjustment. As a result such prior art devices must be used in combination with a separate tiltable bracket to provide that additional needed capability for elevational adjustment. However, such additional brackets substantially increase the cost and inconvenience of utilizing such prior art retro-reflective prism assemblies and as a result, increase the overall cost and time consumed in carrying out the surveying process. In this respect, an additional disadvantage of the prior art is the lack of a convenient means for azimuth adjustment on the tripod. Typical prior art retro-reflective prism assemblies are screwed onto a threaded post projecting vertically from the top of the tripod. The tripod is first set in place at the desired location and the retro-reflective prism assembly may then be attached to the tripod at that time by inserting the tripod threaded extension into the base of the prism assembly and turning the prism assembly about a vertical axis until the assembly is screwed down firmly against the top of the tripod. Unfortunately, the azimuth relationship between the prism assembly and the tripod is typically fixed and as a result, in order to change the azimuth direction of the prism assembly it is necessary to pick up the entire tripod and prism assembly combination and rotate that combination about a vertical axis. Although this achieves the desired change in azimuth direction for the prism assembly, it also often results in a perceptible change in the actual physical location of the tripod and as a result, may cause inaccurate measurement or require additional time consuming processes to realign the various components of the measurement process.

Still an additional frequency requirement for retro-reflective prism assemblies is that they be plungable. The term plungable means rotatable approximately 180 degrees about a horizontal axis so that the prism can be redirected to point in substantially the opposite direction without moving the tripod. Obviously, prior art devices which are not tiltable are certainly not plungable and even those that are mechanically connected to tiltable bracket assemblies to enable elevation adjustment are often not plungable because those bracket assemblies are not designed for that degree of movement freedom.

There are numerous other deficiencies in the prior art which as will be seen hereinafter are remedied in the present invention. By way of example, even in those prior art devices that are provided with a separate tiltable bracket to enable elevation adjustment of the prism assembly, a tightening mechanism, such as a threaded knob, is used to secure the prism assembly in its selected elevational position and typically changes the elevational adjustment when it is being tightened. As a result, it is not uncommon for precisely selected elevational angles to be inadvertently changed when the elevation locking mechanism is tightened to secure the prism assembly in its tilted position. Therefore, it is very difficult to obtain a precise elevation angular adjustment selected for the prism assembly without compensating for the additional elevational change induced by tightening that knob. Furthermore, many of the known prior art devices which also utilize a prism consisting of a retro-reflective prism secure the prism within a housing in such a manner that the prism is either not well sealed against the elements such as dust, rain or other condensation or the prism is not well protected against shock. Furthermore it is not uncommon for prior art prisms to be installed in a housing in such a manner that in order to insulate the prism from any substantial levels of shock it is necessary to also place a resilient material behind the prism such as foam rubber. The lack of adequate sealing requires that the prism be coated on its rear reflecting surface in order to retain a consistent reflective coefficient which would otherwise be rendered inconsistent by dust, dirt or water. Unfortunately, such coating tends to reduce the reflective characteristics of the prism.

SUMMARY OF THE INVENTION

The present invention is designed to alleviate or entirely overcome the aforementioned deficiencies of the prior art. More specifically, in the present invention, a unique structure permits tilting and plunging the assembly without requiring a separate tiltable bracket. In addition, a novel housing and sealing arrangement positions and seals the prism for limiting shock and for preventing water leakage while obviating any need for coating the rear surfaces of the prism. Furthermore, an eccentric tilting knob simplifies angular tilt settings by permitting the user to preset such tilt angles as precisely as he desires and then tighten the assembly in this tilted position without affecting the elevation angle during the tightening process. In addition, a convenient transit knob permits the prism assembly to be rotated in azimuth around a vertical axis so that the prism may be tightened into any azimuth direction desired onto the tripod thereby also significantly simplifying azimuth adjustment. In addition to the above noted improvements relative to the prior art, the present invention provides novel vertical sighting holes in the yoke of the assembly which, as will be seen hereinafter, provides for a simple but convenient method for plumbing the assembly. The invention also provides a novel dust cover and means for storing the dust cover on the back of the prism housing when the assembly is in use. Target indicia are applied to both the front and back surfaces of the dust cover to provide a novel target device which may be secured to the face of the prism and to the back of the prism for range targeting with an offset and without an offset, respectively.

OBJECTS OF THE INVENTION

It is therefore a principal object of the present invention to provide an improved retro-reflective prism assembly for use with electronic distance measuring instruments and which overcomes or substantially alleviates all of the aforementioned deficiencies of the prior art.

It is an additional object of the present invention to provide an improved retro-reflective prism assembly having a unique structure which permits tilting and plunging the assembly without requiring a separate tiltable bracket.

It is still an additional object of the present invention to provide an improved retro-reflective prism assembly having a novel housing and sealing arrangement which positions and seals the prism for limiting shock and for preventing water leakage while obviating any need for coating the rear surfaces of the prism.

It is still an additional object of the present invention to provide an improved retro-reflective prism assembly comprising novel tightening devices for both elevation and azimuth adjustment of the prism thereby significantly enhancing the convenience and simplicity for utilizing such assemblies in the field.

It is still an additional object of the present invention to provide an improved retro-reflective prism assembly having a novel dust cover designed for convenient storage on the back of the prism housing and also designed to present range targeting indicia for offset and non-offset targeting.

It is still an additional object of the present invention to provide an improved retro-reflective prism assembly which includes a number of significant, advantageous features which render it less costly to produce and easier to use.

BRIEF DESCRIPTION OF THE DRAWINGS

The aforementioned objects and advantages of the present invention as well as additional objects and advantages thereof, will be more fully understood from the following detailed description of a preferred embodiment of the invention when taken in conjunction with the accompanying drawings in which.

DETAILED DESCRIPTION OF A PREFERRED EMBODIMENT

Figure 1:
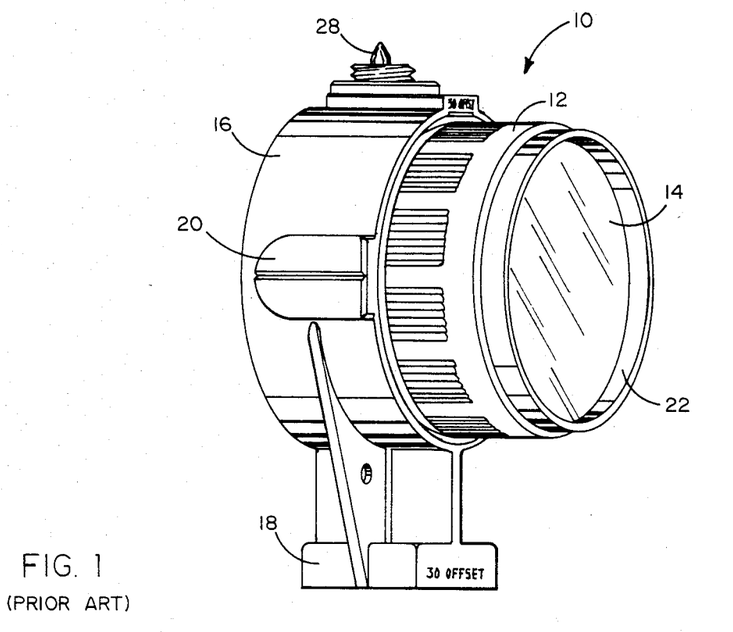
FIGS. 1 through 6 provide isometric and cross-sectional views, respectively of three prior art devices.
Figure 2:
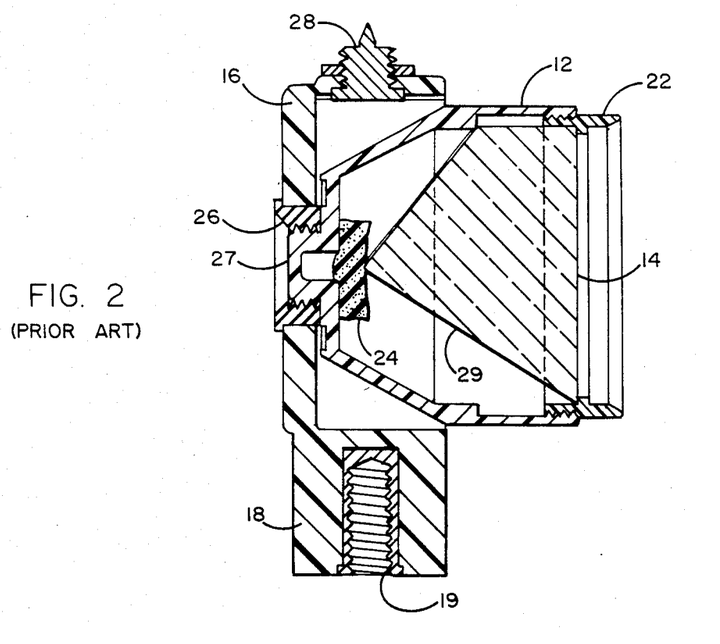

In order to more fully appreciate the novel improvements of the present invention, reference will first be made to FIGS. 1 through 6 which provide two views of each three prior art retro-reflective prism assemblies. Referring first to FIGS. 1 and 2 it will be seen that one prior art retro-reflective prism assembly 10 consists of a housing 12, a prism 14, a stationary bracket 16 and a base 18. Base 18 includes a threaded opening 19 which provides means for mechanically attaching the prior art assembly 10 to a tripod. As seen further in FIGS. 1 and 2, the prism 14 is held within housing 12 by a retaining ring 22. The back of prism 14 is cushioned against the interior of housing 12 by a prism cushion 24 typically comprising some form of resilient material such as foam rubber. The rear portion of housing 12 is formed into a threaded stem 27 which is adapted to engage a matching threaded opening 26 in the stationary bracket 16. Because of the lack of an adequate seal, in order to assure a consistent optical background for the prism 14, a coating 29 is applied to all of the rear surfaces of the prism. The top of stationary bracket 16 is provided with a sighting indicator 28 and the sides of the stationary bracket 16 are provided with a pair of tilt bracket interface flanges 20 which as previously indicated, may be used with such prior art prism assemblies for adding a tilting or elevational adjustment capability of means of a separate tilting bracket not shown.

Figure 3:
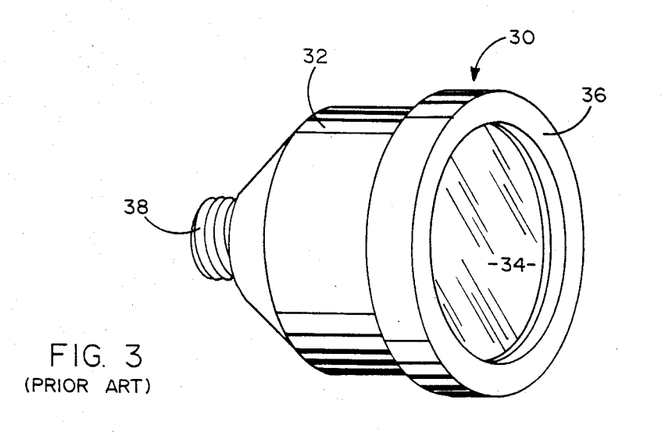
Figure 4:
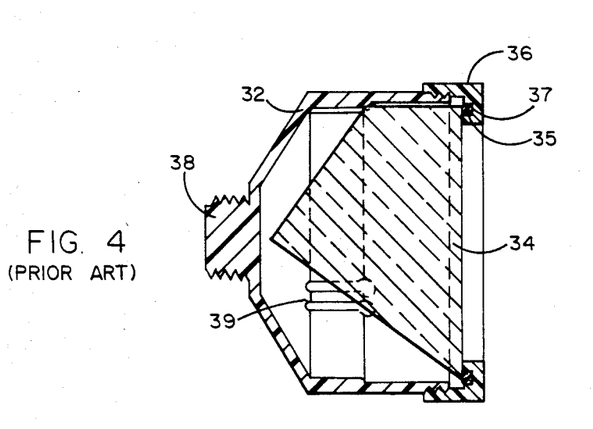

An additional prior art prism assembly 30 is illustrated in FIGS. 3 and 4. As seen in these figures, prior art prism assembly 30 comprises a housing 32, a prism 34 and a retaining ring 36. Like the prior art assembly of FIGS. 1 and 2, the assembly of FIGS. 3 and 4 is also provided with a threaded stem 38 at the rear portion of the housing 32 permitting connection of the housing 32 to a stationary bracket of the type disclosed in FIGS. 1 and 2 to provide a means for connecting the assembly 30 to a tripod. As seen in FIGS. 3 and 4 the prism assembly 30 seats the prism 34 within housing 32 in a somewhat different manner. More specifically, in this prior art configuration the retaining ring 36 is provided with a groove 37 in which an O-ring 35 is positioned for providing sealing pressure against the front face of prism 34 and the back of the prism 34 is seated within a plurality of prism retention grooves 39 spaced symmetrically upon the interior surface of housing 32. Unfortunately, the position of O-ring 35 does not seal against environmental elements that might enter the housing between the threads of the housing and the retaining ring. Therefore, prism coating may be avoided only by gluing ring 36 to housing 32.

Figure 5:
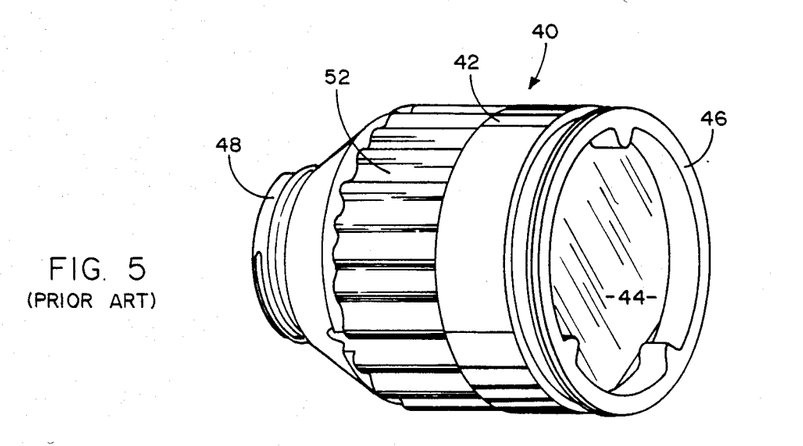
Figure 6:
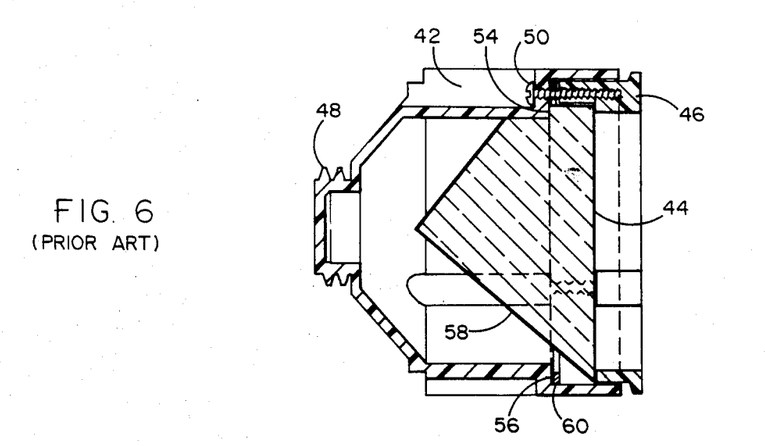

Still a third prior art prism assembly is illustrated in FIGS. 5 and 6. More specifically, it is seen that prior art prism assembly 40 comprises a housing 42, a prism 44 and a retaining ring 46. In this prior art configuration, the housing 42 is also adapted for connection to a stationary bracket of the type shown in FIG. 2 by means of a threaded stem 48 formed at the back of the housing. Unlike the other prior art assemblies shown in FIGS. 1 through 4, the assembly of FIGS. 5 and 6 secures the retaining ring 46 to the housing 42 by means of a plurality of screws 50. Access to the heads of screws 50 may be gained by means of a plurality of grooves 52 formed into the peripheral surface of the housing 42 thereby providing for connection and disconnection of the retaining ring 46 from the housing 42. The prism is secured in a stationary position within housing 42 by means of a spaced plurality of prism platforms 54 which are forced in compressive engagement with a corresponding housing platform 56 as a result of the compressive engagement of retaining ring 46 with the housing 42 upon tightening of screws 50. A metal ring 60 is placed between the housing platform 56 and the prism platforms 54 to more equally distribute the compressive force over the entire housing platform 56. Finally, it is to be noted that in this prior art assembly it is again necessary to apply a prism coating 58 to the rear surfaces of prism 54 to provide a uniform reflective surface for the prism, despite dust, rain and other elements which might affect the rear surfaces of the prism.

From the above general descriptions of three examples of prior art prism assemblies, it will be observed that none of those prior art prism assemblies is tiltable and plungable without the addition of separate bracket units and none provides a seal unit which includes an O-ring and accompanying groove placed relative to the prism for both preventing shock and sealing the unit against water while also assuring proper positioning of the prism and precluding the need for coating that is found in the prior art.

Figure 7:
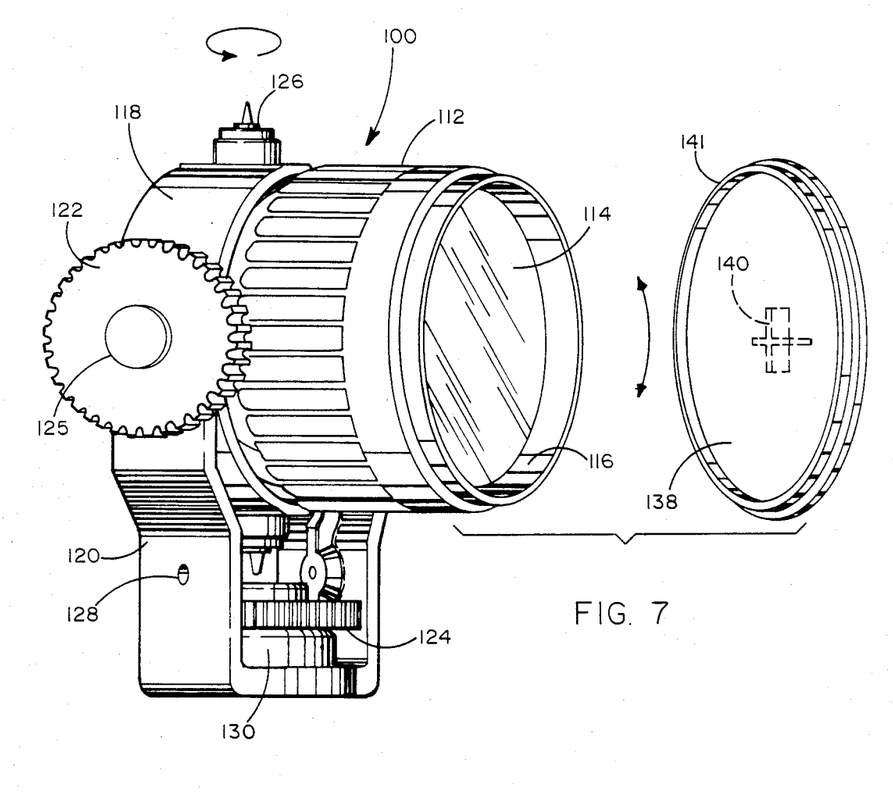
FIG. 7 is a three dimensional view of the present invention.

Reference will now be made to FIGS. 7 through 10 for a more detailed description of the present invention. More specifically, as seen in FIG. 7, the present invention consists of an improved retro-reflective prism assembly 100 comprising a prism housing 112, a prism 114, a retaining ring 116, a pivoting housing 118 and a yoke 120. An eccentric knob 122 is secured to one side of yoke 120 and a transit knob 124 is secured to the bottom portion of yoke 120 in concentric engagement with a transit base 130 of the yoke. A pair of vertically aligned sighting indicators 126 are positioned at the uppermost and lowermost portions of the pivoting housing 118, respectively. The lowermost sighting indicator 126 is aligned with a pair of sighting holes 128 in the yoke 120.

Figure 8:
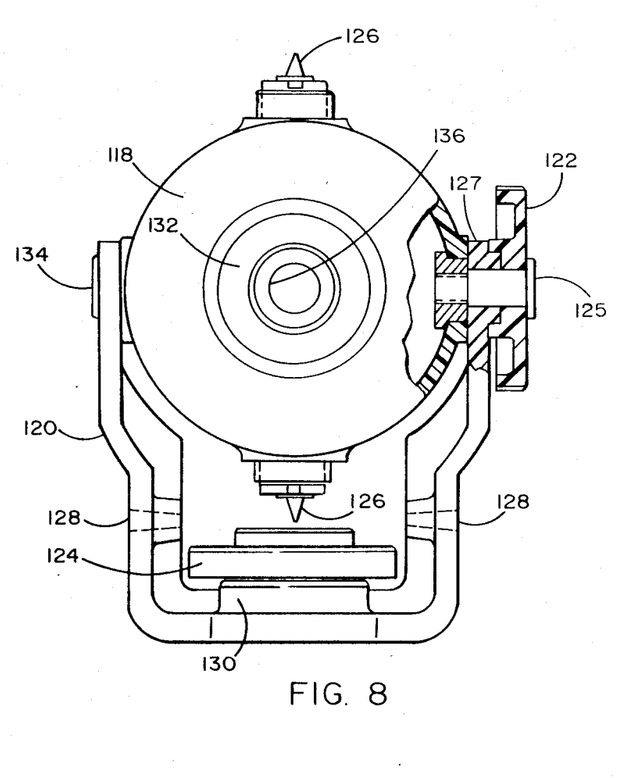
FIG. 8 is a rear partially cross-sectional view of the present invention.
Figure 9:
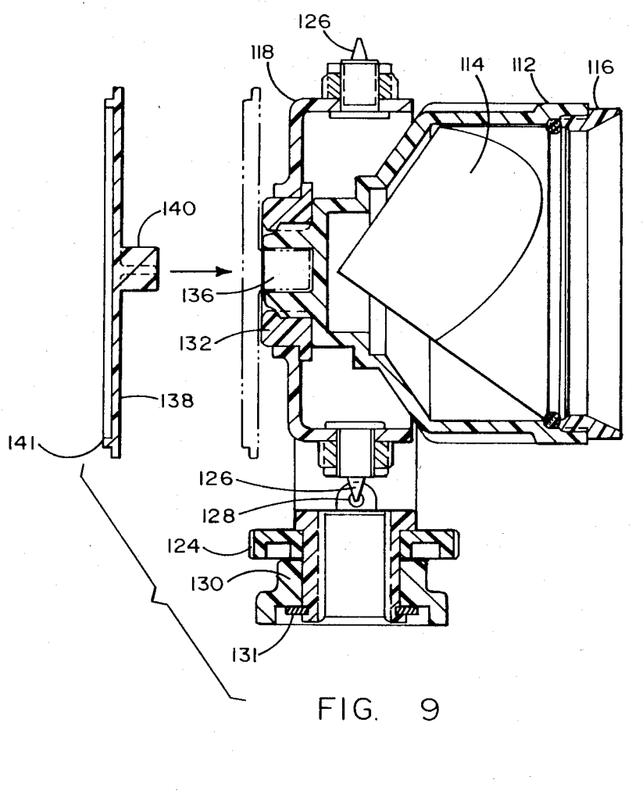
FIG. 9 is a side cross-sectional view of the present invention.

As seen best in FIGS. 8 and 9, the prism housing 112 is secured to the pivoting housing 118 by means of a concentrically positioned prism insert 132 and the yoke 120 is secured to the pivoting housing 118 by means of a locking screw 125 extending through eccentric knob 122 on one side of the housing and a pivot screw 134 on the opposite side of the housing. Knob 122 is referred to as eccentric because locking screw 125 extends through the knob between five and eight thousandths of an inch off center and through the companion yoke boss 127 off center by about the same dimension. As a result, tightening knob 122 immediately locks the housing to the yoke without imparting torque to the housing. As also seen best in FIGS. 8 and 9, the tapered rear end of prism housing 112 is provided with a dust cover storage slot 136 which is adapted to receive a dust cover storage prong 140 of dust cover 138. In this manner, dust cover 138, when not in use for covering the exposed side of prism 114, may be stored at the rear end of the assembly 100 so that it is readily available for covering the prism 114 when the assembly is no longer in use. In this regard the dust cover 138 includes an annular flange 141 which is adapted to frictionally engage the exterior perimeter of retaining ring 116 in order to be secured in a prism covering configuration.

Figure 10:
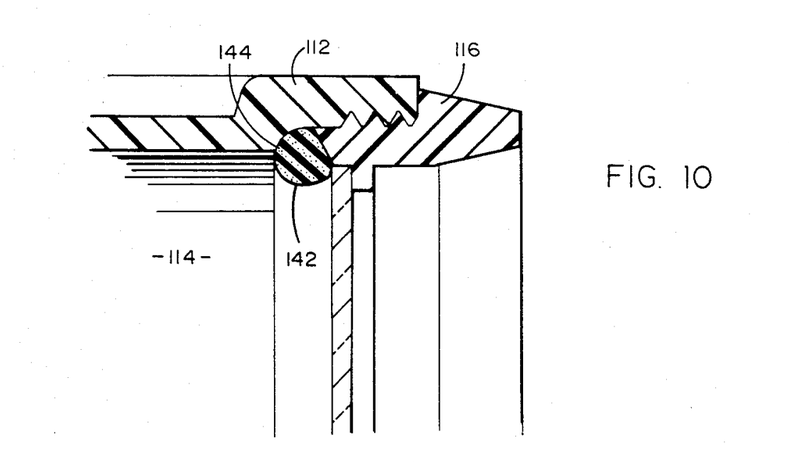
FIG. 10 is an enlarged view of a portion of the invention seen in FIG. 9.

FIG. 10 provides an expanded view of the retaining ring 116 and prism housing 112 immediately adjacent an O-ring 142. As seen in FIG. 10, the mating portions of the prism housing 112 and retaining ring 116 provides an O-ring groove 114 for seating the O-ring where it may be used to apply engaging and sealing pressure against the outer perimeter of the front surface of prism 114. However, it will be observed that unlike the prior art device of FIG. 4 which also utilizes an O-ring, in the present invention, the O-ring also provides a seal whereby water leakage through the threaded interface between the retaining ring and the prism housing cannot pass into the assembly because of the O-ring location. This differs significantly from the prior art apparatus of FIG. 4 where the O-ring serves only the sole function of providing a pressure surface against the prism but fails to provide any sealing means for preventing water leakage through the analogous interface surface between the retaining ring and the prism housing thereby not precluding leakage into the housing as is provided in the present invention. As a result, the retaining ring need not be glued to the housing and the rear surfaces of the prism need not be coated even without such gluing.

In typical operation, the assembly of the present invention is first placed on a tripod having a threaded post compatible with the internal threading of transit base 130. The unit is then turned in azimuth to the desired position and transit knob 124 is rotated clockwise until the unit is tightened onto the tripod with the selected azimuth angle being maintained as a result of the retaining ring 121 seen best in FIG. 9. If vertical operation of the assembly is desired, the unit may then be plumbed for precise vertical orientation by loosening eccentric knob 122 and rotating housing 112 until the lower sighting indicator is centered within the view provided by sighting holes 128 on yoke 120. On the other hand, if it is desired to change the elevational angle of the prism to an angle other than vertical, knob 122 is loosened and the unit is rotated in elevation to the desired angle. Then the eccentric knob 122 is tightened without affecting the selected angle. If it desired to plunge the prism or in other words, rotate it approximately 180 degrees to point it towards a second source of light energy from a direction opposite a first source of light energy, it is only necessary to loosen knob 122 and rotate the housing the desired 180 degrees to achieve this plunged position. In either case, when the unit is to be used, dust cover 138 may be removed from the prism and stored in the back of the prism by inserting dust cover storage prong 140 into dust cover storage slot 136 in the back of the prism housing 112. It is to be noted that there is no need for any type of rear end cushioning as found in the prior art. Furthermore, prism 114 need not be coated as is required of the prior art prisms discussed previously, because sealing is assured even when retaining ring 116 is not glued to housing 112.

Figure 11:
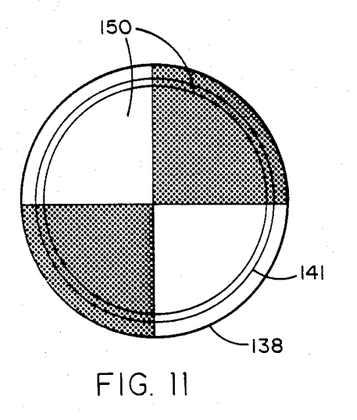
FIGS. 11 and 12 are front and back views, respectively, of a dust cover of the invention.
Figure 12:
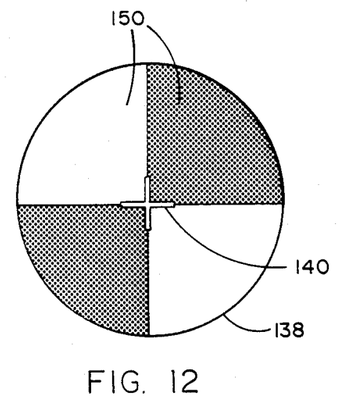

FIGS. 11 through 14 illustrate a novel optional feature of the present invention. More specifically, as seen in FIGS. 11 and 12, the dust cover 138 may comprise targeting indicia on both of its circular surfaces. In the illustrative example of FIGS. 11 and 12, these indicia are in the form of circular guadrants 150 of alternately contrasting optical characteristics such as distinct colors or black and white, and centered at the precise center of the dust cover.

Figure 13:
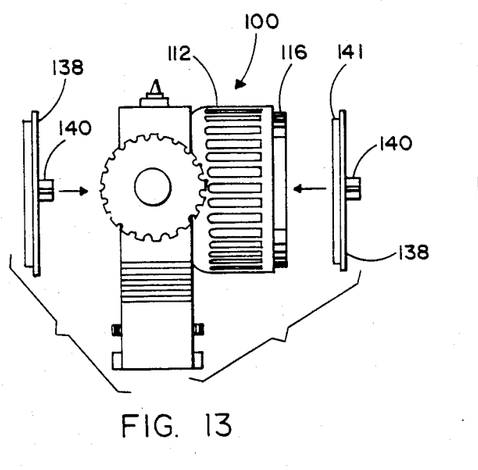
FIGS. 13 and 14 are alternate side views of the invention illustrating the advantageous implementation of the dust cover.
Figure 14:
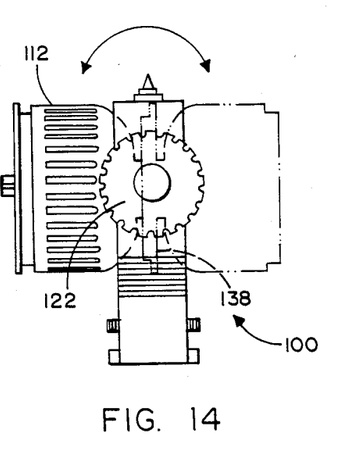

The manner in which the dust cover is utilized for targeting purposes is illustrated in FIGS. 13 and 14. As seen in FIG. 13, dust cover 138 may be installed either on the face of the assembly by fitting annular flange 141 over retaining ring 116, or on the back of the assembly by inserting prong 140 into storage slot 136 (see FIGS. 8 and 9). Because cover 138 has targeting indicia on both sides, either location for dust cover installation exposes a target that is centered on the prism 114. As a result, targeting may be accomplished with either or both zero and non-zero offset as illustrated in FIG. 14. In FIG. 14, the solid line configuration of the assembly includes the dust cover on the face of the prism thereby presenting an offset target to a user positioned to the left as seen in FIG. 14. If desired, the housing 112 may be plunged by simply rotating it 180 degrees about the horizontal axis through eccentric knob 122 to conform to the phantom line configuration of FIG. 14. Furthermore, dust cover 138 may then be removed from the face of the prism and installed on the back of the prism to present a zero offset target to the user at the same location.

It will now be understood that what has been disclosed herein is an improved retro-reflective prism assembly for use with electronic distance measuring instruments in surveying and other civil engineering applications. A unique structure permits tilting and plunging the assembly without requiring a separate tiltable bracket. A novel housing and sealing arrangement positions and seals the prism for limiting shock and preventing water leakage while obviating any need for coating the rear surfaces of the prism. An eccentric tilting knob simplifies angular tilt settings while a convenient transit knob simplifies azimuth adjustment. Vertical sighting holes in the yoke of the assembly provide for convenient plumbing in the assembly. Furthermore, a uniquely configured dust cover is designed for convenient storage on the back of the prism housing during use of the assembly, and for providing both zero and non-zero offset targeting.

It will also be understood that although a preferred embodiment of the invention has been disclosed herein, the specific teaching herein disclosed will enable those having skill in the art to which the present invention pertains to conceive various modifications and additions which may be made to the disclosed invention. However, it is to be understood that all such modifications and additions are contemplated to be within the scope of the invention which is to be limited only by the claims appended hereto.

We claim:

1. An improved retro-reflective prism assembly comprising:
   a retro-reflective prism,
   a substantially cylindrical prism housing having an open end for receiving said prism and having a closed end of substantially conical shape,
   a retaining ring threadably engaging said open end of said prism housing for securing said prism within said prism housing,
   a pivoting housing of substantially cylindrical configuration and having an open end for receiving said closed end of said prism housing, and
   a U-shaped yoke member, the opposing sides of said yoke member being rotatably attached to said pivoting housing at opposed locations thereon, and the bottom of said yoke member being configured for rotatable connection to a tripod,
   said prism housing and said retaining ring each comprising a portion of an annular groove, said groove being completed upon threaded engagement of said retaining ring and said prism housing, and said assembly further comprising an O-ring contained within said completed groove in compressive engagement with said prism and in sealing engagement with the engaging surfaces of said prism housing and said retaining ring, whereby to provide a watertight seal of said prism housing without gluing said retaining ring to said prism housing.

2. The improved retro-reflective prism assembly of claim 1 wherein said pivoting housing may be rotated about a horizontal axis at least 180 degrees within said yoke member, whereby said prism may be plunged and adjusted in elevation.

3. The improved retro-reflective prism assembly of claim 1 wherein said U-shaped yoke member is attached to said pivoting housing by at least one eccentric knob for tightening said pivoting housing in a selected angle of rotation.

4. The improved retro-reflecting prism assembly of claim 1 wherein said configured bottom of said yoke member comprises a threaded cylindrical opening, a fixed retaining ring and a knob, said ring and said knob being positioned concentrically relative to said opening whereby said knob may be tightened for locking said yoke member to a tripod and may be loosened for unlocking said yoke member from said tripod for adjusting the azimuth direction of said assembly without moving said tripod.

5. The improved retro-reflecting prism assembly of claim 1 further comprising a sighting indicator attached to the lowermost portion of said pivoting housing and having a pointer for pointing along a precise vertical axis when said pivoting housing is vertically oriented, and a pair of sighting holes located in the opposing sides of said yoke member, the holes being aligned with said pointer for observing when said pointer is on said vertical axis.

6. The improved retro-reflective prism assembly of claim 1 further comprising a prism dust cover configured for frictionally engaging said retaining ring for covering said prism and having a storage prong extending therefrom, said prism housing having a slot at the closed end for receiving said dust cover storage prong for storing said dust cover at the closed end of said prism housing.

7. The improved retro-reflective prism assembly of claim 6, wherein said dust cover comprises target indicia on at least one surface thereof for targeting the center of said prism from a remote location.

8. The improved retro-reflective prism assembly of claim 7, wherein said dust cover further comprises target indicia on opposite surfaces thereof for targetingg the center of said prism from a remote location irrespective of whether said cover is engaging said retaining ring or is in said stored configuration.

9. An improved retro-reflective prism assembly comprising:
   a retro-reflective prism,
   a substantially cylindrical prism houing having an open end for receiving said prism and having a closed end of substantially conical shape, a retaining ring threadably engaging said open end of said prism housing for securing said prism within said prism housing, means for connecting said prism housing to a tripod for elevation and azimuth adjustment relative to said tripod, said prism housing and said retaining ring each comprising a portion of an annular groove, said groove being completed upon threaded engagement of said retaining ring and said prism housing, and said assembly further comprising an O-ring contained within said completed groove in compressive engagement with said prism and in sealing engagement with the engaging surfaces of said prism housing and said retaining ring, whereby to provide a watertight seal of said prism housing without gluing said retaining ring to said prism housing.

* * * * *